United States Patent [19]

Ikoma et al.

[11] Patent Number: 4,925,748
[45] Date of Patent: May 15, 1990

[54] ALKALINE STORAGE BATTERY USING HYDROGEN ABSORBING ALLOY

[75] Inventors: Munehisa Ikoma, Katano; Hiroshi Kawano, Ibaraki; Osamu Takahashi, Fujisawa; Isao Matsumoto, Osaka; Masakazu Ikeyama, Katano, all of Japan

[73] Assignee: Matsushita Electric Industrial Co., Ltd., Osaka, Japan

[21] Appl. No.: 356,229

[22] Filed: May 24, 1989

[30] Foreign Application Priority Data

Feb. 23, 1989 [JP] Japan .................................. 64-43710

[51] Int. Cl.$^5$ ........................................... H01M 10/24
[52] U.S. Cl. ...................................... 429/59; 429/101; 429/206; 429/212; 429/218
[58] Field of Search ............... 429/57, 59, 27, 101, 429/206, 212, 217, 218, 223, 224; 252/182.1

[56] References Cited

U.S. PATENT DOCUMENTS

| | | |
|---|---|---|
| 3,850,694 | 11/1974 | Dunlop et al. ............... 429/27 X |
| 4,214,043 | 7/1980 | van Deutekom ............... 429/27 |
| 4,312,928 | 1/1982 | van Deutekom ............... 429/27 |
| 4,487,817 | 12/1984 | Willems et al. ............... 429/27 |
| 4,636,445 | 1/1087 | Yamano et al. ............... 429/53 |
| 4,702,978 | 10/1987 | Heuts et al. ............... 429/218 |
| 4,752,546 | 6/1988 | Heuts et al. ............... 429/218 |
| 4,826,744 | 5/1989 | Itou et al. ............... 429/206 |
| 4,837,119 | 6/1989 | Ikoma et al. ............... 429/206 |

Primary Examiner—Anthony Skapars
Attorney, Agent, or Firm—Stevens, Davis, Miller & Mosher

[57] ABSTRACT

Disclosed is an improvement of a hydrogen absorbing alloy to be used as a negative electrode of an alkaline storage battery. The hydrogen absorbing alloy capable of electrochemically absorbing/desorbing hydrogen has a $CaCu_5$ type crystal structure and is represented by the general formula of $A_{1-x}B_xC_yD_z$, in which formula: D is selected from the group consisting of V, In, Tl, Ga and mixtures thereof; the atomic ratio z has a value within the range made up as follows, $0.02 \leq z \leq 0.3$ for V, $0.02 \leq z \leq 0.1$ for In, $0.02 \leq z \leq 0.1$ for Tl, and $0.02 \leq z \leq 0.1$ for Ga; and the atomic ratio (y+z) has a value within the range of from 4.7 to 5.3.

18 Claims, 3 Drawing Sheets

ALKALINE STORAGE BATTERY USING HYDROGEN ABSORBING ALLOY

BACKGROUND OF THE INVENTION

The present invention relates to an alkaline storage battery using a negative electrode including, as a main constituent material, a hydrogen absorbing alloy capable of electrochemically absorbing/desorbing hydrogen and, more particularly, relates to an improvement in this type hydrogen absorbing alloy.

Recently such a hydrogen absorbing alloy capable of electrochemically absorbing/desorbing hydrogen serving as an active material in a battery has attracted attention as a negative electrode material having high energy density. Investigation has been performed as to development of high-capacity storage batteries such as nickel-hydrogen storage battery or manganese dioxide-hydrogen storage battery using a combination of negative electrode of the type described above and available positive electrodes such as nickel positive electrode or manganese dioxide positive electrode. Conventionally, alloys having a $CaCu_5$ type crystal structure and represented by the general formula $AB_mC_n$ have been proposed as hydrogen absorbing alloys to be used for negative electrode of this type nickel-hydrogen storage battery (Japanese Patent Unexamined Publication No. 60-89066 and U.S. Pat. No. 4,487,817). In the above formula, A is selected one from the group consisting of misch metal, Y, Ti, Hf, Zr, Ca, Th, La and other rare-earth elements; B is at least one element selected from the group consisting of Ni, Co, Fe and Mn; m is an atomic ratio within the range made up as follows, $m \leq 3.5$ for Ni, $m \leq 3.5$ for Co, $m \leq 3.5$ for Cu, $m \leq 2.0$ for Fe, and $m \leq 1.0$ for Mn; C is at least one element selected from the group of Al, Cr and Si; and n is an atomic ratio within the range made up as follows, $0.05 \leq n \leq 0.6$ for Al, $0.05 \leq n \leq 0.5$ for Cr, and $0.05 \leq n \leq 0.6$ for Si. As shown in the aforementioned proposal, a part of an alloy, for example, an $LaNi_5$ alloy, is substituted by other elements to prepare a multicomponent alloy so as to prevent the alloy from becoming fine power by repetition of charging/discharging cycles and prevent the generated alloy powder from being oxidized to thereby prolong the cycle life of the battery.

Further, in Japanese Patent Unexamined Publication No. 61-233969, a multicomponent alloy represented by the general formula $LnNi_xMn_yM_z$ is proposed, in which formula Ln is a selected one of or a mixture of rare-earth elements; M is at least one element selected from the group consisting of Co, Cu, Fe, Al, Cr, Zn, Ti, Zr, Mo, Si and Mg; z is an atomic ratio within the range made up as follows, $0 \leq z \leq 0.2$ for Co, $0 \leq z \leq 2$ for Cu, $0 \leq z \leq 2$ for Fe, $0 \leq z \leq 0.9$ for Al, $0 \leq z \leq 1$ for Cr, $0 \leq z \leq 0.5$ for Zn, $0 \leq z \leq 0.3$ for Ti, $0 \leq z \leq 0.3$ for Zr, $0 \leq z \leq 0.3$ for Mo, $0 \leq z \leq 0.5$ for Si, and $0 \leq z \leq 0.3$ for Mg; x is an atomic ratio of not smaller than 3.5; and y is an atomic ratio of not larger than 1.5. The purpose of such a multicomponent alloy is also to prevent the alloy from becoming fine powder due to repetition of charging/discharging cycles, that is, due to repetition of absorption/desorption of hydrogen, to thereby prolong the cycle life of the battery.

In such a prior art configuration, although the problem with respect to the deterioration due to repetition of charging/discharging cycles could be solved, a new problem has been caused in that the internal gas pressure of the battery is so increased in a rapid charging period that it becomes difficult to perform the rapid charging.

In general, in a nickel-hydrogen storage bettery, the principle of the sealed cell design is the same as the oxygen extinguishing mechanism in a nickel-cadmium battery which has been proposed by Neumann, and the chargeable capacity of the negative electrode is established to be larger than that of the positive electrode. That is to say, the negative electrode is made so as not to be perfectly charged to have a notcharged portion remained even after the positive electrode has been perfectly charged, so that a hydrogen gas is prevented from being generated from the negative electrode is an overcharging period and at the same time, an oxygen gas generated from the positive electrode is absorbed to the negative electrode by the reaction represented by the following formula (1) to keep the sealing state of the battery, $$MH_x + O_2 \rightarrow MH_{x-4} + 2H_2O \tag{1}$$

in which M is a hydrogen absorbing alloy.

In the case where the negative electrode constituted by a hydrogen absorbing alloy is charged electrochemically (to absorb hydrogen) according to the formula (2), however, the hydrogen generation reaction represented by the formula (3) is carried out competitively in the last stage of the charging period.

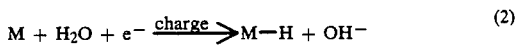

$$M + H_2O + e^- \xrightarrow{\text{charge}} M-H + OH^- \tag{2}$$

in which M is a hydrogen absorbing alloy.

$$H_2O + e^- \rightarrow OH^- + 1/2 H_2 \uparrow \tag{3}$$

The hydrogen generation reaction, which is a competitive reaction, is carried out in an earlier stage of the negative electrode charging period, as the negative electrode is charged more rapidly. Accordingly, even through the sealed nickel-hydrogen battery is constructed so that the chargeable capacity of the negative electrode is established to be larger than that of the positive electrode, a hydrogen gas is generated from the negative electrode in the rapid charging period and cannot be removed, thereby the internal gas pressure of the battery is increased remarkably. As the result, a gas as well as an alkaline electrolytic solution are leaked from a safety vent (in general, which is operated by pressure of 10 to 15 kg/cm$^2$). There arises therefore a new problem in that deterioration of cycle life and lowering of safety are caused by the leakage of the electrolytic solution.

OBJECTS AND SUMMARY OF THE INVENTION

An object of the present invention is to solve the aforementioned problems in the prior art.

That is to say the object of the invention to provide an excellent sealed alkaline storage battery in which generation of hydrogen from a hydrogen absorbing alloy constituting a negative electrode is suppressed in a rapid charging period to thereby prevent remarkable increase in internal gas pressure of the battery.

To attain the foregoing objects, in an alkaline storage battery such as a nickel-hydrogen storage battery comprising a positive electrode including a metal oxide such as a nickel positive electrode having nickel oxide as an active material, a negative electrode including, as its main constituent material, a hydrogen absorbing alloy capable of electrochemically absorbing/desorbing hydrogen acting as an active material, an alkaline electrolytic solution, and a separator, according to the present invention, a hydrogen absorbing alloy having a $CaCu_5$ type crystal structure and being represented by the general formula $A_{1-x}B_xC_yD_z$ is used as the negative electrodes, in which formula; A is selected from the group consisting of La, mixture of La and rare-earth elements, and misch metal; B is selected from the group consisting of Ti, Zr, Ca, Y, Hf and mixture thereof; x is an atomic ratio within the range $0 \leq x \leq 0.2$; C is selected from the group consisting of Ni, Co, Mn, Al, Fe, Cu, Cr and mixtures thereof; y is an atomic ratio within the range made up as follows, $y > 3.5$ for Ni, $y \leq 1.0$ for Co, $y \leq 0.6$ for Mn, $y \leq 0.5$ for Al, $y \leq 0.3$ for Fe, $y \leq 1.0$ for Cu, and $y \leq 0.3$ for Cr; D is selected from the group consisting of V, In, Tl, Ga and mixtures thereof; z is an atomic ratio within the range made up as follows, $0.02 \leq z \leq 0.3$ for V, $0.02 \leq z \leq 0.1$ for In, $0.02 \leq z \leq 0.1$ for Tl, and $0.02 \leq z \leq 0.1$ for Ga; and $(y+z)$ is an atomic ratio within a range of from 4.7 to 5.3.

According to the present invention, alternatively, the positive electrode may be a nickel electrode having nickel oxide as as active material or may be another metal oxide electrode having a metal oxide such as manganese dioxide as an active material. Further alternatively, the positive electrode may be a composite electrode containing nickel oxide and manganese oxide combined in a suitable ratio by weight.

In the above configuration, according to the present invention, V is contained in the hydrogen absorbing alloy having a $CaCu_5$ type crystal structure to thereby increase the lattice constant of the $CaCu_5$ type crystal so as to increase the diffusion rate of hydrogen atoms in a solid phase so that no hydrogen gas is generated till the end of the cahrging period even when the battery is charged rapidly. Further, in the case where at least one element selected from the group consisting of In, Tl and Ga is added into the hydrogen absorbing alloy, the overvoltage in the hydrogen gas generation reaction becomes high and the generation of a hydrogen gas can be prevented till the end of the charging period even when the battery is charged rapidly. Accordingly, when a sealed storage battery is constituted by using a hydrogen absorbing alloy containing at least one element selected from the group consisting of V, In, Tl and Ga for the negative electrode thereof, a hydrogen gas is hardly generated from the negative electrode so that remarkable increase in internal gas pressure of the battery can be prevented even if the battery is subjected to rapid charging.

DETAILED DESCRIPTION OF THE INVENTION

Figure 1:
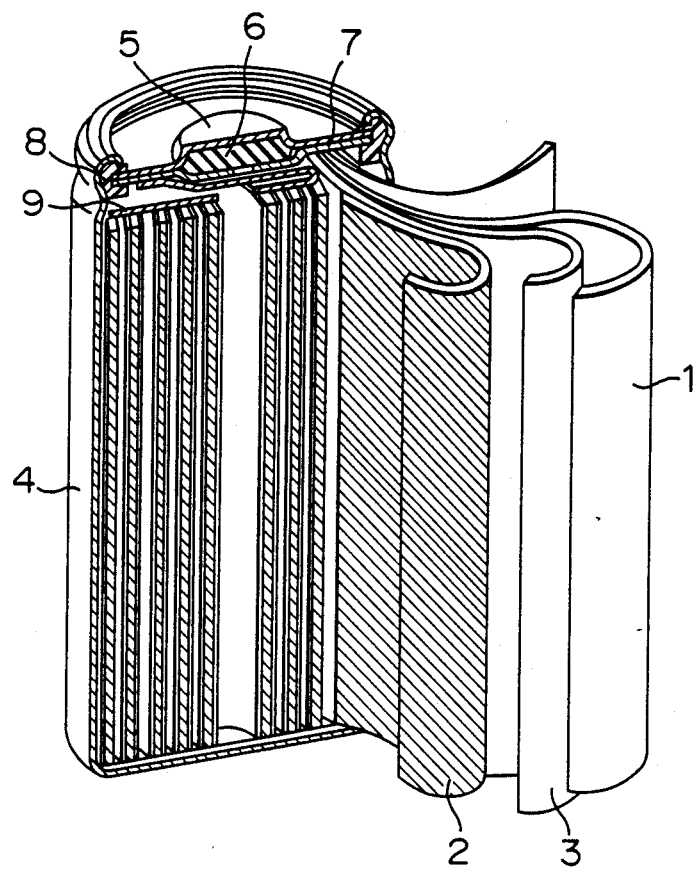
FIG. 1 is a view showing the structure of a sealed alkaline storage battery as an embodiment according to the present invention.

The present invention will be described hereunder with reference to the following examples.

EXAMPLE 1

That selected, as the above element A, from the group consisting of La and available misch metal Mm (a mixture of rare-earth elements, such as for example La by about 25 wt. %, Ce by about 52 wt. %, Nd by about 18 wt. %, and Pr by about 5 wt. %), that selected, as the above element B, from the group consisting of Ti, Zr, Ca, Y and Hf, that selected, as the above element C, from the group consisting of Ni, Co, Mn, Al, Fe, Cu and Cr, and that selected, as the element D, from the group consisting of V, In, Tl and Ga were weighed and mixed in predetermined ratios to prepare various samples. The samples were put into an arc furnace. The furnace was evacuated to obtain a vacuum state of $10^{-4}$ to $10^{-5}$ torr. Then, the samples were heated so as to be melted by arc discharge under the reduced pressure in an atmosphere of an argon gas. The samples were inverted several times to thereby obtain homogeneous alloys. To make the alloys more homogeneous, the alloys were heated in a vacuum at 1050° C. for 6 hours. Then, the alloys were ground roughly and then pulverized by a ball mill to prepare various kinds of fine powder having a particle diameter of not larger than 38 μm.

Then, each of the various kinds of fine powder was dipped in a 7.2 N potassium hydroxide aqueous solution at 80° C. for one hour to dissolve a part of the alloy surface. Then, the fine powder was washed with water and dried to prepare various kinds of fine powder having a rough alloy surface. The fine powder was mixed into an aqueous solution containing 1.5 wt. % polyvinyl alcohol to prepare paste. Then, a foamed nickel porous matrix was filled with the paste, dried and pressed to prepare negative electrodes formed of various alloy compositions.

The alloy content in each of the negative electrodes was selected to be 7.2 g. Table shows the compositions of the hydrogen absorbing alloys contained in the negative electrodes used in this example. Each of those negative electrodes 1 and a nickel positive electrode 2 prepared by filling a known foamed metal with nickel hydroxide were inserted into a case 4 serving as a negative electrode terminal in the state that the negative electrode 1 and the positive electrode 2 were wound spirally through a separator 3 formed of sulfonated polypropylene non-woven fabric. Then, 2.2 cm³ of an alkaline electrolytic solution prepared by dissolving 40 g/l of $LiOH.H_2O$ in a 7.1 N KOH aqueous solution was injected into the case 4 and sealed to prepare a 1000 mAh AA-size sealed nickel-hydrogen storage battery. The structure of the thus prepared battery is shown in FIG. 1.

In FIG. 1, a safety vent 6 provided in the inner side of a positive electrode cap 5 is established to be operated by pressure of not lower than 30 kg/cm² for the purpose of measuring the internal gas pressure of the battery, though in general such a safety vent is established so as to be operated by pressure of 11 to 12 kg/cm². In the drawing, the reference numeral 7 designates a sealing plate, 8 designates an insulating gasket, and 9 designates a positive electrode collector for electrically connecting the positive electrode 2 and the sealing plate 7. After the battery just assembled was charged with 0.1 CmA for 15 hours at 20° C. and then discharged with 0.2 CmA, a 1 mm diameter hole was formed in the bottom portion of the case 4. The battery was then fixed to a apparatus having a pressure sensor attached thereto and the internal gas pressure of the battery was measured when the battery was subject to 150% charging with 1 CmA. The results of measurement, together with the ratios of the alloy components, are shown in Table.

TABLE

| Electrode | Alloy composition | Internal gas pressure of the battery when charged with 1 CmA (150% charge) |
|---|---|---|
| A | $MmNi_{3.7}Co_{0.5}Mn_{0.4}Al_{0.3}V_{0.1}$ | 4 |
| B | $MmNi_{3.58}Co_{0.7}Mn_{0.4}Al_{0.3}V_{0.02}$ | 7 |
| C | $MmNi_{3.6}Co_{0.5}Mn_{0.4}Al_{0.3}V_{0.2}$ | 6 |
| D | $MmNi_{3.6}Co_{0.5}Mn_{0.4}Al_{0.3}In_{0.05}$ | 7.6 |
| E | $MmNi_{3.7}Co_{0.5}Mn_{0.4}Al_{0.3}In_{0.1}$ | 7 |
| F | $MmNi_{3.58}Co_{0.7}Mn_{0.4}Al_{0.3}Tl_{0.02}$ | 6.0 |
| G | $MmNi_{3.7}Co_{0.5}Mn_{0.4}Al_{0.3}Tl_{0.1}$ | 7.3 |
| H | $MmNi_{3.58}Co_{0.7}Mn_{0.4}Al_{0.3}Ga_{0.02}$ | 5.2 |
| I | $MmNi_{3.7}Co_{0.7}Mn_{0.4}Al_{0.3}Ga_{0.1}$ | 7.8 |
| J | $MmNi_{3.7}Co_{0.5}Mn_{0.4}Fe_{0.3}V_{0.1}$ | 5.2 |
| K | $MmNi_{3.7}Co_{0.5}Mn_{0.4}Cu_{0.3}V_{0.1}$ | 5.5 |
| L | $MmNi_{3.7}Co_{0.5}Mn_{0.4}Cr_{0.3}V_{0.1}$ | 5.8 |
| M | $MmNi_{3.7}Co_{0.5}Mn_{0.4}Al_{0.3}V_{0.1}In_{0.03}$ | 4.5 |
| N | $Mm_{0.9}Ti_{0.1}Ni_{3.7}Co_{0.5}Mn_{0.4}Al_{0.3}V_{0.1}$ | 4.8 |
| O | $Mm_{0.9}Zr_{0.1}Ni_{3.7}Co_{0.5}Mn_{0.4}Al_{0.3}V_{0.1}$ | 5.3 |
| P | $Mm_{0.9}Ca_{0.1}Ni_{3.7}Co_{0.5}Mn_{0.4}Al_{0.3}V_{0.1}$ | 5.5 |
| Q | $Mm_{0.95}Y_{0.05}Ni_{3.7}Co_{0.5}Mn_{0.4}Al_{0.3}V_{0.1}$ | 5.2 |
| R | $Mm_{0.95}Y_{0.05}Ni_{3.7}Co_{0.5}Mn_{0.4}Al_{0.3}V_{0.1}$ | 5.2 |
| S | $MmNi_{3.4}Co_{0.6}Mn_{0.4}Al_{0.3}V_{0.1}$ | 13 |
| T | $MmNi_{3.7}Co_{1.1}Mn_{0.2}Al_{0.1}V_{0.1}$ | 15 |
| U | $MmNi_{3.6}Co_{0.6}Mn_{0.7}Al_{0.3}V_{0.1}$ | 12 |
| V | $MmNi_{3.4}Co_{0.6}Mn_{0.4}Al_{0.6}V_{0.1}$ | 14 |
| W | $MnNi_{3.6}Co_{0.5}Mn_{0.4}Al_{0.3}$ | 18 |

In the Table, electrodes A to R are examples prepared according to the present invention, whereas electrodes S to W are comparative examples. The Sf value of the alloy used in each of the electrodes A to R is not larger than 2.5. The theoretical capacity in each of the electrodes A to R is in a range of from 220 to 250 mAh/g. The internal gas pressure in each of the batteries using the electrodes A to R according to the present invention was excellent and not higher than 7.8 kg/cm² though the battery was rapidly charged with 1 CmA. On the other hand, the internal gas pressure of the battery using the electrode W formed of an alloy not containing V, In, Tl or Ga was remarkably increased to 18 kg/cm² when the battery was charged with 1 CmA. In the case of using alloys, as shown in comparative examples S to V, containing Ni by an atomic ratio of 3.4, Co by an atomic ratio of 1.1, Mn by an atomic ratio of 0.7 and Al by an atomic ratio of 0.6, the internal gas pressure of the battery became not lower than 10 kg/cm² though the alloy contained V.

Accordingly, the Sf value $\{=In(P_{H/M}=0.75/P_{H/M}=0.25)\}$ in each of the alloys obtained from the isothermal curve of pressure vs. composition is not smaller than 2.5, so that the theoretical capacity is not larger than 2000 mAh/g. Accordingly, the theoretical capacity of the negative electrode is lowered to increase the quantity of a hydrogen gas generated in an overcharging period, so that the internal gas pressure of the battery is increased. Though not shown in the Table, the internal gas pressure of a battery using an alloy containing Fe by an atomic ratio of 0.4, Cu by an atomic ratio of 1.0, and Cr by an atomic ratio of 0.4 became not lower than 10 kg/cm². Further, the amount of substitution of elements, such as Ti, Zr, Ca, Y and Hf, represented by B in the general formula, for elements represented by A is limited within a suitable range. If the atomic ratio x of substitution of these elements is not smaller than 0.2, the quantity of alloy phase effective for hydrogen absorption ($CaCu_5$ type crystal structure) is reduced so that the quantity of absorbed hydrogen is reduced. Consequently, in the case where the atomic ratio x was not smaller than 0.2, a large amount of hydrogen gas was generated to increase the internal gas pressure of the battery to 15 kg/cm² though the battery was assembled in the same condition. Accordingly, it is preferable that the atomic ratio x of substitution of elements Ti, Zr, Ca, Y and Hf for the element A is not larger than 0.2 even in the case where the alloy contains at least one element selected from the group consisting of V, In, Tl and Ga.

Although this embodiment has shown the case where polyvinyl alcohol is used as a binding agent, it is to be understood that, according to the present invention, a hydrophobic resin such as polytetrafluoroethylene may be used as a binding agent to be disposed in a part of the electrode.

EXAMPLE 2

Figure 2:
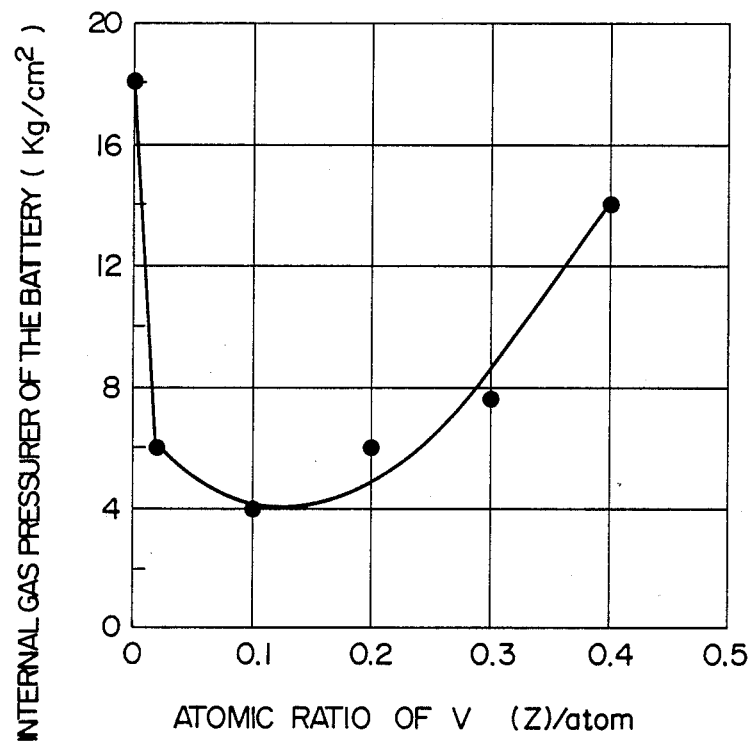
FIG. 2 is a graph view showing the relation between the atomic ratio of substitutive V and the internal gas pressure of the battery in the case where the negative electrode is charged to 150% with 1 CmA.
Figure 3:
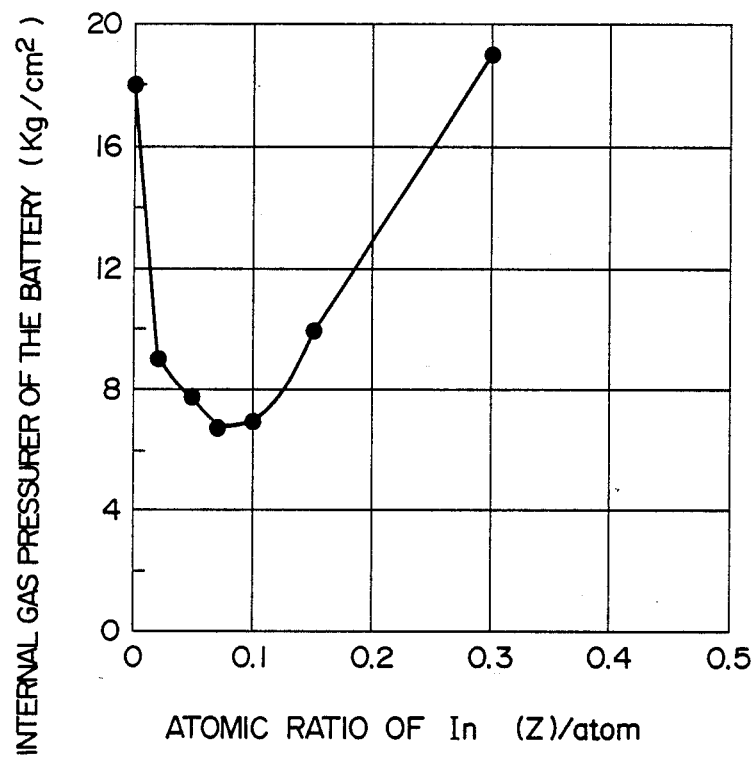
FIG. 3 is a graph view showing the relation between the atomic ratio of substitutive In and the internal gas pressure of the battery.

Hydrogen absorbing alloys represented by the general formulae $MmNi_{3.8-z}Co_{0.5}Mn_{0.4}Al_{0.3}V_z$ and $MmNi_{3.8-z}Co_{0.05}Mn_{0.4}Al_{0.3}In_z$ were used for electrodes. While the atomic ratio z was changed within a range of from 0 to 0.4, the relation between the amount of substitution of V and In and the internal gas pressure of the battery charged with 1 CmA was examined. The results of examination are shwon in FIGS. 2 and 3. The condition of production of alloys and electrodes, the condition of construction of batteries and the condition of measurement of internal gas pressure of the battery were the same as in the Example 1. As shown in FIG. 2, the internal gas pressure of a battery using an alloy ($MmNi_{3.8}Co_{0.5}Mn_{0.4}Al_{0.3}$) prepared without substitution of V for Ni was 18 kg/cm² which was a very large value. However, the internal gas pressure of the battery was reduced to 6 kg/cm² by substituting 0.02 atomic part V for Ni. In this case, the battery has excellent characteristics. When the atomic ratio of V substituted for Ni was not larger than 0.3, the internal gas pressure of the battery was not higher than 10 kg/cm². In this case, the safety vent was not opened though the battery was charged with 1 CmA, so that there was not problem in leakage of solution. Accordingly, the batteries have excellent characteristics. However, when the atomic ratio of substitution of V was 0.4, the internal gas pressure of the battery was 14 kg/cm². Accordingly, it is preferable that the atomic ratio of substitution of V is selected to be within a range of from 0.02 to 0.3. FIG. 3 shows the results of examination in the case where In is substituted for Ni. Also in the case of In, the same tendency as in the case of V was shown. When the atomic ratio of substitution of In was selected to be within a range of from 0.02 to 0.1, the internal gas pressure of the battery charged with 1 CmA was not higher than 10 kg/cm². Accordingly, it is preferable to select the atomic ratio of substitution of In to be within a range of from 0.02 to 0.1.

As described above, in an alkaline storage battery comprising a positive electrode including a metal oxide such as nickel oxide, manganese oxide or the like, as a main constituent material, a negative electrode including, as a main constituent material, a hydrogen absorbing alloy capable of electrochemically absorbing/desorbing hydrogen serving as an active material, an alkaline electrolytic solution, and a separator, according to the present invention, a hydrogen absorbing alloy represented by the general formula of $A_{1-x}B_xC_yD_z$ is used as the negative electrode, in which formula; A is selected from the group consisting of La, mixture of rare-earth elements, and misch metal; B is selected from the group consisting of Ti, Zr, Ca, Y, Hf and mixtures thereof; C is selected from the group consisting of Ni, Co, Mn, Al, Fe, Cu, Cr and mixtures thereof; D is selected from the group consisting of V, In, Tl, Ga and mixtures thereof; x has a value within a range of from 0 to 0.2; y has a value within the range made up as follows, $y>3.5$ for Ni, $y\leq1.0$ for Co, $y\leq0.6$ for Mn, $y\leq0.5$ for Al, $y\leq0.3$ for Fe, $y\leq1.0$ for Cu, and $y\leq0.3$ for Cr; and z has a value within the range made up as follows, $0.02\leq z\leq0.3$ for V, $0.02\leq z\leq0.1$ for In, $0.02\leq z\leq0.1$ for Tl, and $0.02\leq z\leq0.1$ for Ga. Accordingly, generation of a hydrogen gas from the hydrogen absorbing alloy of the negative electrode can be limited. There arises an effect in that the internal gas pressure of the battery is not over 10 kg/cm$^2$. Accordingly, there is no leakage of the alkaline electrolytic solution entrained with a gas from the safety vent. Consequently, according to the present invention, a sealed alkaline storage battery excellent in safety can be provided.

We claim:

1. An alkaline storage battery using a hydrogen absorbing alloy, said battery comprising: a positive electrode including a metal oxide as a main constituent material; a negative electrode including, as a main constituent material, a hydrogen absorbing alloy capable of electrochemically absorbing/desorbing hydrogen serving as an active material; an alkaline electrolytic solution; a separator; and said hydrogen absorbing alloy of said negative electrode having a CaCu$_5$ type crystal structure and being represented by the general formula of $A_{1-x}B_xC_yD_z$, in which formula: A is selected from the group consisting of La, mixtures of rare-earth elements, and misch metal; B is selected from the group consisting of Ti, Zr, Ca, Y, Hf and mixtures thereof; x is an atomic ratio within the range $0\leq x\leq0.2$; C is selected from the group consisting of Ni, Co, Mn, Al, Fe, Cu, Cr and mixtures thereof; y has an atomic ratio within the range made up as follows, $y>3.5$ for Ni, $y\leq1.0$ for Co, $y\leq0.6$ for Mn, $y\leq0.5$ for Al, $y\leq0.3$ for Fe, $y\leq1.0$ for Cu, and $y\leq0.3$ for Cr; D is selected from the group consisting of V, In, Tl, Ga and mixtures thereof; z is an atomic ratio within the range made up as follows, $0.02\leq z\leq0.3$ for V, $0.02\leq z\leq0.1$ for In, $0.02\leq z\leq0.1$ for Tl, and $0.02\leq z\leq0.1$ for Ga; and (y+z) is an atomic ratio within the range of from 4.7 to 6.3.

2. An alkaline storage battery using a hydrogen absorbing alloy according to claim 1, in which said hydrogen absorbing alloy has a rough surface.

3. An alkaline storage battery using a hydrogen absorbing alloy according to claim 1, in which said hydrogen absorbing alloy has an Sf value $\{=ln(P_{H/M}=0.75/P_{H/M}=0.25)\}$ of not larger than 2.5, said Sf value representing flatness of plateau pressure in the case where hydrogen is desorbed from said hydrogen absorbing alloy.

4. An alkaline storage battery using a hydrogen absorbing alloy according to claim 1, in which said metal oxide included in said positive electrode as its main constituent material is a nickel oxide.

5. An alkaline storage battery using a hydrogen absorbing alloy according to claim 1, in which said metal oxide included in said positive electrode as its main constituent material is a manganese oxide.

6. An alkaline storage battery using a hydrogen absorbing alloy according to claim 1, in which at least a part of said negative electrode has hydrophobic property.

7. An alkaline storage battery using a hydrogen absorbing alloy, said battery comprising: a positive electrode including a metal oxide as a main constituent material; a negative electrode including, as a main constituent material, a hydrogen absorbing alloy capable of electrochemically absorbing/desorbing hydrogen serving as an active material; an alkaline electrolytic solution; a separator; and said hydrogen absorbing alloy of said negative electrode having a CaCu$_5$ type crystal structure and being represented by the general formula of MmNi$_a$Co$_b$Mn$_c$Al$_d$V$_e$, in which formula; Mm represents a misch metal; a is an atomic ratio within the range $a>3.5$; b is an atomic ratio within the range $0.25<b<1.0$; c is an atomic ratio within the range $0.2<c<0.6$; d is an atomic ratio within the range $0.1<d<0.3$; and e is an atomic ratio within the range $0.02<e<0.3$.

8. An alkaline storage battery using a hydrogen absorbing alloy according to claim 7, in which said hydrogen absorbing alloy has a rough surface.

9. An alkaline storage battery using a hydrogen absorbing alloy according to claim 7, in which said hydrogen absorbing alloy has an Sf value $\{=ln(P_{H/M}=0.75/P_{H/M}=0.25)\}$ of not larger than 2.5, said Sf value representing flatness of plateau pressure in the case where hydrogen is desorbed from said hydrogen absorbing alloy.

10. An alkaline storage battery using a hydrogen absorbing alloy according to claim 7, in which said metal oxide included in said positive electrode as its main constituent material is a nickel oxide.

11. An alkaline storage battery using a hydrogen absorbing alloy according to claim 7, in which said metal oxide included in said positive electrode as its main constituent material is a manganese oxide.

12. An alkaline storage battery using a hydrogen absorbing alloy according to claim 7, in which at least a part of said negative electrode has hydrophobic property.

13. An alkaline storage battery using a hydrogen absorbing alloy, said battery comprising; a positive electrode including a metal oxide as a main constituent material; a negative electrode including, as a main constituent material, a hydrogen absorbing alloy capable of electrochemically absorbing/desorbing hydrogen serving as an active material; an alkaline electrolytic solution; a separator; and said hydrogen absorbing alloy of said negative electrode having a CaCu$_5$ type crystal structure and being represented by the general formula of MmNi$_a$Co$_b$Mn$_c$Al$_d$In$_e$, in which formula; Mm represents a misch metal; a is an atomic ratio within the range $a>3.5$; b is an atomic ratio within the range $0.25<b<1.0$; c is an atomic ratio within the range $0.2<c<0.6$; d is an atomic ratio within the range $0.1<d<0.3$; and e is an atomic ratio within the range $0.02<e<0.1$.

14. An alkaline storage battery using a hydrogen absorbing alloy according to claim 13, in which said hydrogen absorbing alloy has a rough surface.

15. An alkaline storage battery using a hydrogen absorbing alloy according to claim 13, in which said hydrogen absorbing alloy has an Sf value $\{=ln(P_{H/M}=0.75/P_{H/M}=0.25)\}$ of not larger than 2.5, said Sf value representing flatness of plateau pressure in the case where hydrogen in desorbed from said hydrogen absorbing alloy.

16. An alkaline storage battery using a hydrogen absorbing alloy according to claim 13, in which said metal oxide included in said positive electrode as its main constituent material is a nickel oxide.

17. An alkaline storage battery using a hydrogen absorbing alloy according to claim 13, in which said metal oxide included in said positive electrode as its main constituent material is a manganese oxide.

18. An alkaline storage battery using a hydrogen absorbing alloy according to claim 13, in which at least a part of said negative electrode has hydrophobic property.

* * * * *